US009785678B1

(12) United States Patent
Peery et al.

(10) Patent No.: US 9,785,678 B1
(45) Date of Patent: Oct. 10, 2017

(54) DETERMINING TAXONOMY NODES FOR BROWSING

(71) Applicant: Amazon Technologies, Inc., Seattle, WA (US)

(72) Inventors: Christopher Robin Peery, Seattle, WA (US); Lam Duy Nguyen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 290 days.

(21) Appl. No.: 14/556,497

(22) Filed: Dec. 1, 2014

(51) Int. Cl.
   *G06F 17/30* (2006.01)
   *G06Q 30/06* (2012.01)
   *H04L 29/08* (2006.01)

(52) U.S. Cl.
   CPC ..... *G06F 17/3053* (2013.01); *G06Q 30/0627* (2013.01); *H04L 67/10* (2013.01)

(58) Field of Classification Search
   CPC ........ G06F 17/30427; G06F 17/30707; G06F 17/30598; G06F 17/30864; G06F 17/30657; G06F 17/30672; G06F 17/30648; G06F 17/3053; G06F 17/30; G06Q 30/0625; G06Q 30/0621; G06Q 30/0643; G06Q 30/0627; H04L 65/1069; H04L 67/10
   See application file for complete search history.

(56) References Cited

U.S. PATENT DOCUMENTS

| | | | |
|---|---|---|---|
| 8,311,900 B1 * | 11/2012 | Bates ................. | G06Q 30/0601 705/27.1 |
| 2003/0050915 A1 * | 3/2003 | Allemang ......... | G06F 17/30731 707/E17.058 |
| 2003/0069908 A1 * | 4/2003 | Anthony ............. | G06F 17/2247 707/E17.006 |
| 2004/0254950 A1 * | 12/2004 | Musgrove ......... | G06F 17/30327 707/E17.032 |
| 2006/0095345 A1 * | 5/2006 | Ka ..................... | G06Q 30/0603 705/26.62 |
| 2010/0293073 A1 * | 11/2010 | Schmidt ............ | G06F 17/30525 705/26.62 |
| 2012/0084282 A1 * | 4/2012 | Chiang ............. | G06F 17/30864 707/725 |
| 2016/0253332 A1 * | 9/2016 | Balakrishnan .... | G06F 17/30424 707/E17.006 |

\* cited by examiner

*Primary Examiner* — Anh Ly
(74) *Attorney, Agent, or Firm* — Thomas Horstemeyer, LLP (57) ABSTRACT

Disclosed are various embodiments for a node selection application. Utility nodes are selected from a taxonomy according to utility scores with respect to a search query. Relevant nodes are selected from the taxonomy according to relevance scores with respect to the search query. A collection of taxonomy nodes is recommended according to a convergence between the utility nodes and the relevant nodes.

20 Claims, 5 Drawing Sheets

DETERMINING TAXONOMY NODES FOR BROWSING

BACKGROUND

Catalogs of items may be organized into a taxonomy, including items in one or more taxonomy nodes. Upon entering a search query, a user may be presented with suggested taxonomy nodes that may be used to further refine the search. A search of the catalog of items may be refined in scope by searching within a selected taxonomy node. These suggested taxonomy nodes may exist at varying depths of the taxonomy graph.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Catalogs of items, such as those available through an electronic commerce system, may be organized into a taxonomy. The taxonomy may be represented as a graph, with each node representing a category or grouping of items. The nodes may exist in a parent-child relationship, with child nodes grouping subsets of those items grouped by the parent nodes. Applying a search query to the catalog may return items included in a variety of taxonomy nodes. To further refine the search, a user may select a taxonomy node to refine the scope of the search. The search query would then be applied to the subset of items grouped by the selected taxonomy node. In this manner, a user's search query can be refined to a more narrow selection.

When users submit a search query, they may be presented with suggested taxonomy nodes that may be selected to refine their search and assist in browsing the catalog. The most useful or relevant taxonomy nodes may vary depending on the search query submitted. For example, a search query for "Sherlock Holmes," applicable to a variety of media, may include items in broad taxonomy nodes encompassing many items, such as "Movies," "Books," or "Television Shows." As another example, a search query for a specific type of item such as "Left-Handed Battery Powered Tools" may result in more narrow suggested taxonomy nodes, such as those for a particular manufacturer or type of tool. Accordingly, as useful and relevant taxonomy nodes may exist at various depths depending on the search query submitted, the depth of the taxonomy node may not be the most dispositive criterion for determining a suggested taxonomy node.

A node selection application calculates, for a submitted search query, utility scores and relevance scores for taxonomy nodes in the catalog. The utility scores may be based on past user interactions made after a user had submitted the search query and selected the corresponding node. A first subset of the taxonomy nodes may be selected according to the utility scores, and a second subset of the taxonomy nodes may be selected according to the relevance scores. The node selection application then may determine a convergence of the first and second subsets to select a collection of taxonomy nodes deemed both useful and relevant for suggestion to the user. The collection of taxonomy nodes may be limited according to a maximum size threshold, such as one set by a display size for encoding the suggested taxonomy nodes.

In the following discussion, a general description of the system and its components is provided, followed by a discussion of the operation of the same.

Figure 1:
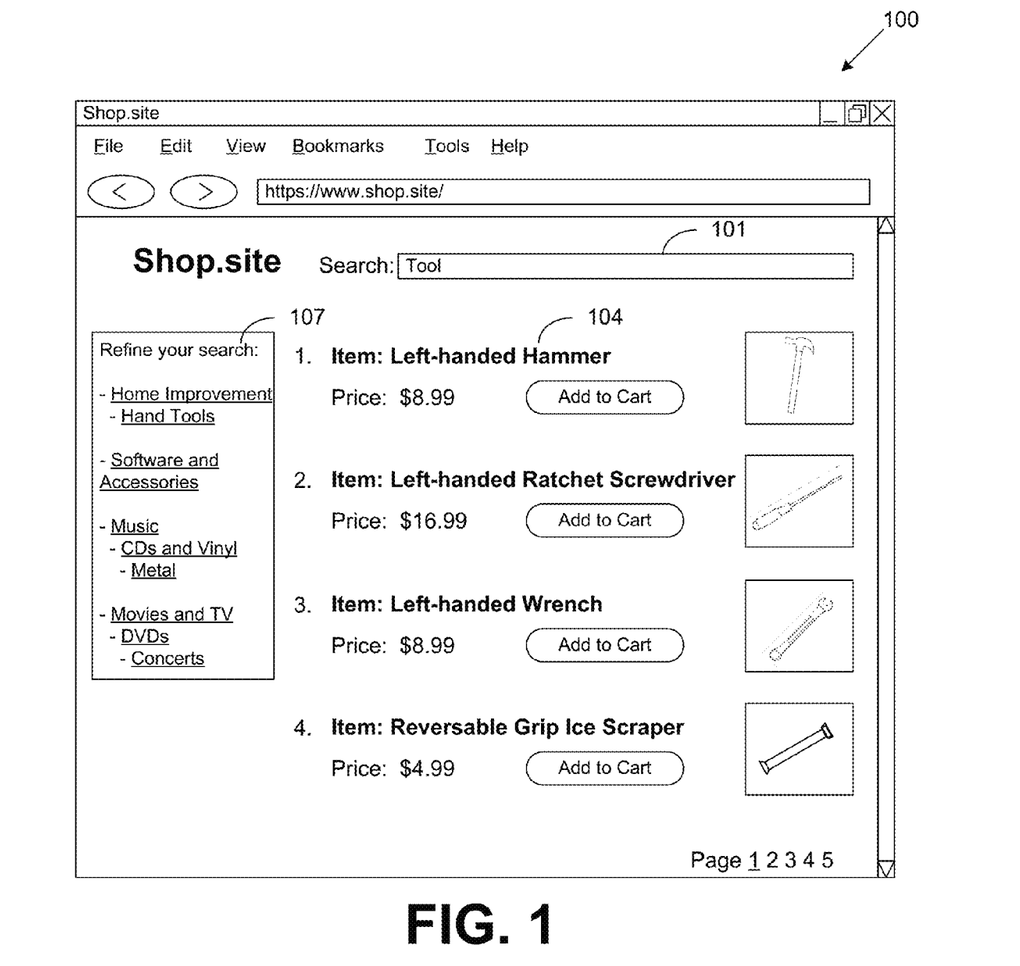
FIG. 1 is an example scenario of a user interface according to various embodiments of the present disclosure.

With reference to FIG. 1, shown is an example user interface 100 for searching using suggested taxonomy nodes and a search query as applied to a catalog. Element 101 is an input field for a search query applied to a catalog of the electronic commerce system. Element 104 is an example representation of search results responsive to the search query as applied to a corpus of the catalog. Element 107 is a collection of taxonomy nodes suggested for selection to refine the search. A selection of one of the taxonomy nodes indicated in element 107 would then navigate the user to a search results page for the search query as applied to the subset of the catalog grouped by the selected taxonomy node. In this example, the taxonomy nodes included in element 107 are selected according to a convergence between taxonomy nodes determined to have a high utility and taxonomy nodes determined to be relevant with respect to the search query.

Figure 2:
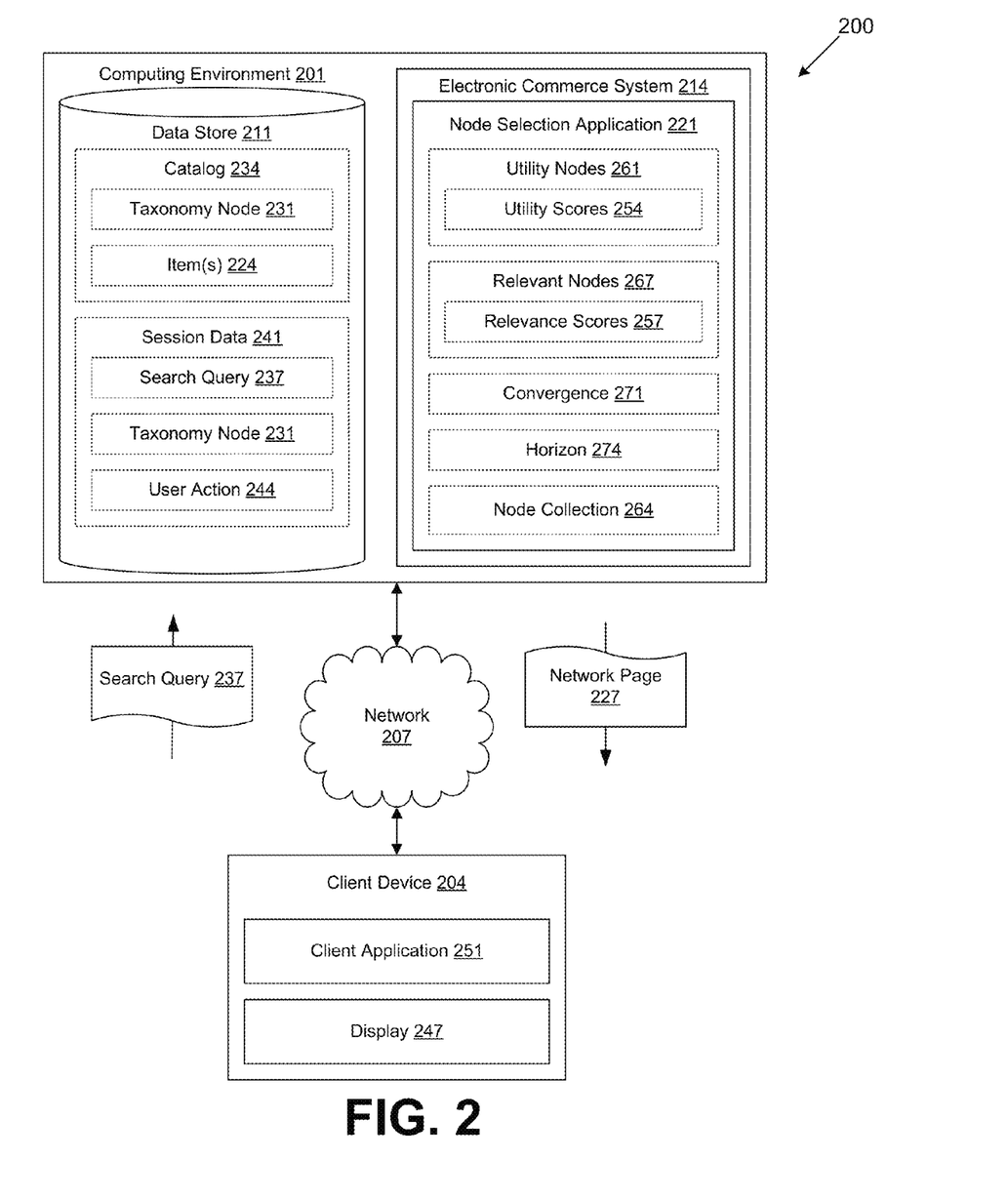
FIG. 2 is a drawing of a networked environment according to various embodiments of the present disclosure.

Moving on to FIG. 2, shown is a networked environment 200 according to various embodiments. The networked environment 200 includes a computing environment 201, and a client device 204, which are in data communication with each other via a network 207. The network 207 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 201 may comprise, for example, a server computer or any other system providing computing capability. Alternatively, the computing environment 201 may employ a plurality of computing devices that may be arranged, for example, in one or more server banks, computer banks or other arrangements. Such computing devices may be located in a single installation or may be distributed among many different geographical locations. For example, the computing environment 201 may include a plurality of computing devices that together may comprise a hosted computing resource, a grid computing resource and/or any other distributed computing arrangement. In some cases, the computing environment 201 may correspond to an elastic computing resource where the allotted capacity of processing, network, storage, or other computing-related resources may vary over time.

Various applications and/or other functionality may be executed in the computing environment 201 according to various embodiments. Also, various data is stored in a data store 211 that is accessible to the computing environment 201. The data store 211 may be representative of a plurality of data stores 211 as can be appreciated. The data stored in the data store 211, for example, is associated with the operation of the various applications and/or functional entities described below. The components executed on the computing environment 201, for example, include an electronic commerce system 214 having a node selection application 221, and other applications, services, processes, systems, engines, or functionality not discussed in detail herein. The electronic commerce system 214 is executed in order to facilitate the online purchase of items 224 over the network 207. The electronic commerce system 214 also performs various backend functions associated with the online presence of a merchant in order to facilitate the online purchase of items 224 as will be described. For example, the electronic commerce system 214 generates network pages 227 such as web pages or other types of network content that are provided to client devices 204 for the purpose of selecting items 224 for purchase, rental, download, lease, or other form of consumption as will be described.

The node selection application 221 is executed to select taxonomy nodes 231 from a catalog 234 of items 224 for suggestion to a user of the electronic commerce system 214 in response to the submission of a search query 237. This allows a user to select one of the suggested taxonomy nodes 231, thereby refining the scope of the catalog 234 to which the search query 237 is applied.

The data stored in the data store 211 includes, for example, the catalog 234, session data 241, and potentially other data. The catalog 234 encodes a collection of items 224 according to a taxonomy. The taxonomy may be represented by taxonomy nodes 231 linked in a graph such as a directed graph, undirected graph, or other graph as can be appreciated. For example, the taxonomy nodes 231 may be linked in a parent-child relationship, where a parent taxonomy node 231 may have one or more descendant taxonomy nodes 231, while a child taxonomy node 231 may have one or more ancestor taxonomy nodes 231. The catalog may include multiple disconnected taxonomy node 231 graphs, or a single connected taxonomy node 231 graph.

Session data 241 is representative of a user interaction history with respect to the electronic commerce system 214. A session may be defined as a period of interaction with the electronic commerce system 214 after the submission of a search query 237 and a selection of a taxonomy node 231. To this end, session data 241 may indicate one or more user actions 244 taken by a user during the session. This may include the selection of an item 224 for browsing a detail page, an addition of an item 224 to a shopping cart, wish list, or other list, or the purchase or rental of an item 224. User actions 244 encoded in session data 241 may also indicate that a session terminated without action. A session may terminate by a timeout, a navigation away from the electronic commerce system 214, an indication of a session reset such as returning to a home page or main navigation page, a creation of a new session by selecting another taxonomy node 231 or submitting a new search query 237, or by another approach.

The client device 204 is representative of a plurality of client devices that may be coupled to the network 207. The client device 204 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client device 204 may include a display 247. The display 247 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 204 may be configured to execute various applications such as a client application 251 and/or other applications. The client application 251 may be executed in a client device 204, for example, to access network content served up by the computing environment 201 and/or other servers, thereby rendering a user interface on the display 247. To this end, the client application 251 may comprise, for example, a browser, a dedicated application, etc., and the user interface may comprise a network page, an application screen, etc. The client device 204 may be configured to execute applications beyond the client application 251 such as, for example, email applications, social networking applications, word processors, spreadsheets, and/or other applications.

Next, a general description of the operation of the various components of the networked environment 200 is provided. To begin, a client device 204 submits a search query 237 to the electronic commerce system 214. The node selection application 221 then calculates utility scores 254 for taxonomy nodes 231 in the catalog 234. The utility scores 254 may be calculated for those taxonomy nodes 231 grouping items 224 responsive to the search query 237 or for the corpus of the taxonomy, or another set of taxonomy nodes 231.

A utility score 254 is indicative of a usefulness of a taxonomy node 231 according to previous user interactions with respect to the taxonomy node 231 and the search query 237. For example, a utility score 254 may be calculated as a function of a probability that a user action 244 will occur after selection of the taxonomy node 231 and submission of the search query 237 according to session data 241. The session data 241 from which utility scores 254 are calculated may be limited to a predefined time period, or otherwise limited in scope. The probability of a respective user action 244 may be calculated as a function of a number of sessions for the search query 237 and taxonomy node 231 in which the user action 244 was performed with respect to the totality of sessions for the search query 237 and taxonomy node 231.

In some embodiments, the utility score 254 may be calculated as a function of a weighted sum of the probabilities that various types of user actions 244 will occur. As a non-limiting example, respective weights may be applied to the probabilities that, for a given search query 237 and taxonomy node 231, a user will initiate a purchase, browse an item 224 detail page, add an item 224 to a shopping cart, or perform another user action 244. This allows for higher weights to be applied to more valuable user actions 244, such as initiating a purchase, thereby resulting in a greater utility score 254 if items 224 are frequently purchased using a particular combination of search query 237 and taxonomy node 231. Utility scores 254 may also be calculated by another approach.

The node selection application 221 also calculates relevance scores 257 for taxonomy nodes 231. The taxonomy nodes 231 for which relevance scores 257 are calculated may be the same or different than those for which utility scores 254 are calculated. Relevance scores 257 may be calculated according to a degree to which items 224 responsive to the search query 237 are included in the respective taxonomy node 231, or by any other approach as can be appreciated.

After calculating the utility scores 254 and relevance scores 257, the node selection application 221 selects, as utility nodes 261, those taxonomy nodes 231 having the highest utility score 254. In some embodiments, this may include selecting those taxonomy nodes 231 having a utility score 254 meeting or exceeding a predefined threshold. In other embodiments, this may include selecting a predefined number of taxonomy nodes 231 having a highest rank according to their utility scores 254. In such an embodiment, this predefined number of utility nodes 261 may correspond to a maximum size of a node collection 264 communicated to a client device 204, as will be described in more detail below. The predefined number of taxonomy nodes 231 may also include other values. The node selection application 221 may also select as relevant nodes 267 those taxonomy nodes 231 having a highest relevance score 257. This may be performed according to a similar approach as selecting the utility nodes 261, or by another approach.

After selecting the utility nodes 261 and relevant nodes 267, the node selection application 221 may determine a convergence 271 between the utility nodes 261 and relevant nodes 267. A convergence 271 may be defined as a state in which each of the relevant nodes 267 is either included in the utility nodes 261, is itself excluded from the convergence 271 but has an ancestor node included in the utility nodes 261, or is included in a subgraph disjointed from any of the utility nodes 261. In some embodiments, the utility nodes 261 may be an empty set. For example, sufficient session data 241 may be not be available for the combination of search query 237 and taxonomy node 231. In this example, the graph defined by the relevant nodes 267 may be considered a convergence 271. This may include applying a balancing approach to the graph defined by the relevant nodes 267 as will be discussed in more detail below.

In some embodiments, the relevant nodes 267 may be completely included in the utility nodes 261. In such an embodiment, a convergence 271 has been achieved as the graph of utility nodes 261, thereby including the graph of relevant nodes 267.

In other embodiments, there may be a partial overlap between the utility nodes 261 and the relevant nodes 267, where some relevant nodes 267 are not included in the utility nodes 261. In order to achieve a convergence 271 between the utility nodes 261 and relevant nodes 267, the node selection application 221 may "roll up" relevant nodes 267 having an ancestor utility node 261 into the respective ancestor utility node 261. A descendant taxonomy node 231 may be rolled into an ancestor taxonomy node 231 by removing the descendant taxonomy node 231 and any intervening taxonomy nodes 231 between it and the ancestor taxonomy node 231. Thus, the removed relevant nodes 267 can still be browsed via the ancestor taxonomy node 231.

If a relevant node 267 does not have an ancestor taxonomy node 231 in the utility nodes, the convergence 271 may include a disjointed subgraph defined by these relevant nodes 267. Determining the convergence 271 may then include applying a graph balancing approach to the disjointed subgraphs of the relevant nodes 267, as will be described in detail below.

In some embodiments, a convergence 271 from which a node collection 264 is selected may be restricted to a predefined size of the node collection 264. In such an embodiment, determining the convergence 271 may include rolling up taxonomy nodes 231 otherwise included in the convergence 271 into a common ancestor taxonomy node 231 and including the common ancestor taxonomy node 231 in the convergence 271, thereby reducing the overall size of the convergence 271. The common ancestor taxonomy node 231 into which the other taxonomy nodes 231 are rolled may or may not have been previously included in the convergence 271.

Determining the convergence 271 may also include applying a graph balancing approach to one or more subgraphs of the convergence 271 such that the size of the convergence 271 meets or falls below a predefined threshold. The predefined threshold for the size of the convergence 271 will be discussed in further detail below. The graph balancing approach may be expressed as the following algorithm:

```
begin
    rn := size of node collection
    R := the set of all nodes to be balanced
    if |R| <= rn then exit fi;
    while |R| <= rn do
        sort(R) #sort based on node depth
        foreach n ∈ R do
            Roll up n to n' where n' has depth smaller than the next deepest
                taxonomy node
            remove n from R
            if n' ∌ R
                place n' in R #assume R stays sorted
            fi
        od
    od
end
```

In addition to determining the convergence 271, the node selection application 221 may determine a selection of taxonomy nodes 231 outside of the convergence 271 but satisfying other criteria. This selection is hereinafter referred to as a horizon 274. The criteria may include, for example, a relevant node 267 having a relevance score 257 meeting or exceeding a predefined relevance threshold, or other criteria. As a non-limiting example, a horizon 274 may include a relevant node 267 that had been rolled into an ancestor taxonomy node 231 for generating the convergence 271, but is separately included in the horizon 274 due to it being indicated as highly relevant.

Additionally, certain taxonomy nodes 231 may be required for inclusion or are included by default in the node collection 264. For example, a business requirement, marketing agreement, or other agreement may dictate the inclusion of a taxonomy node 231 in the node collection 264. As another example, a taxonomy node 231 may correspond to a newly created store, section, or other addition to an electronic commerce system 214. Such a taxonomy node 231 may be required for inclusion in the node collection 264 to promote or direct traffic to a particular portion of the electronic commerce system 214. In embodiments in which the convergence 271 is restricted to a predefined size threshold, the presence of taxonomy nodes 231 in a horizon 274 or required to be included in the node collection 264 would accordingly reduce the predefined size threshold for the convergence 271.

A node collection 264 communicated to a client device 204 may be restricted by a predefined size. The predefined size of the node collection 264 may be a function of a display area used by a client device 204 to render the node collection

264. For example, a network page 227 may allocate an amount of space capable of rendering a predefined number of suggested taxonomy nodes 231 in the node collection 264.

In embodiments in which a node collection 264 is restricted to a predefined size, the convergence 271 may be determined as a function of the predefined size. For example, taxonomy nodes 231 in the convergence 271 may be rolled into ancestor taxonomy nodes 231 until the size of the convergence 271 falls below a predefined threshold. In some embodiments, the predefined threshold of the convergence 271 may be the predefined size of the node collection 264. In embodiments in which the node selection application 221 determines a horizon 274, the predefined threshold of the convergence 271 may be the predefined size of the node collection 264 as reduced by a number of relevant nodes 267 included in the horizon 274. Additionally, in embodiments in which one or more taxonomy nodes 231 are required for inclusion in the node collection 264, the predefined threshold of the convergence 271 may be the predefined size of the node collection 264 as reduced by a number of required taxonomy nodes 231. The predefined threshold of the convergence 271 may also be determined by another approach.

Next, the node selection application 221 selects taxonomy nodes 231 for inclusion in the node collection 264. This may include selecting those relevant nodes 267 included in the horizon 274 for addition to the node collection 264. This may also include selecting required or default taxonomy nodes 231 for inclusion in the node collection 264. This may also include selecting, from the convergence 271, relevant nodes 267 included in the utility nodes 261, taxonomy nodes 231 having had an ancestor relevant node 267 rolled into it, relevant nodes 267 in a subgraph that is disjoint from the utility node 261 graphs, or other taxonomy nodes 231.

After selecting the node collection 264, the node selection application 221 then communicates an indication of the node collection 264 to the client device 204. This may include, for example, encoding the node collection 264 in a network page 227 including the search results responsive to the search query 237. For example, the node selection application 221 may be encoded as a selection of navigation aids such as hyperlinks. Each of the navigation aids would then direct navigation to a subset of the catalog 243 grouped under the corresponding taxonomy node 231 and response to the search query 237. Additionally, this may cause the node selection application 221 to generate a subsequent node collection 264 according to the subgraph of the catalog 234 with its root at the selected taxonomy node 231.

Figure 3:
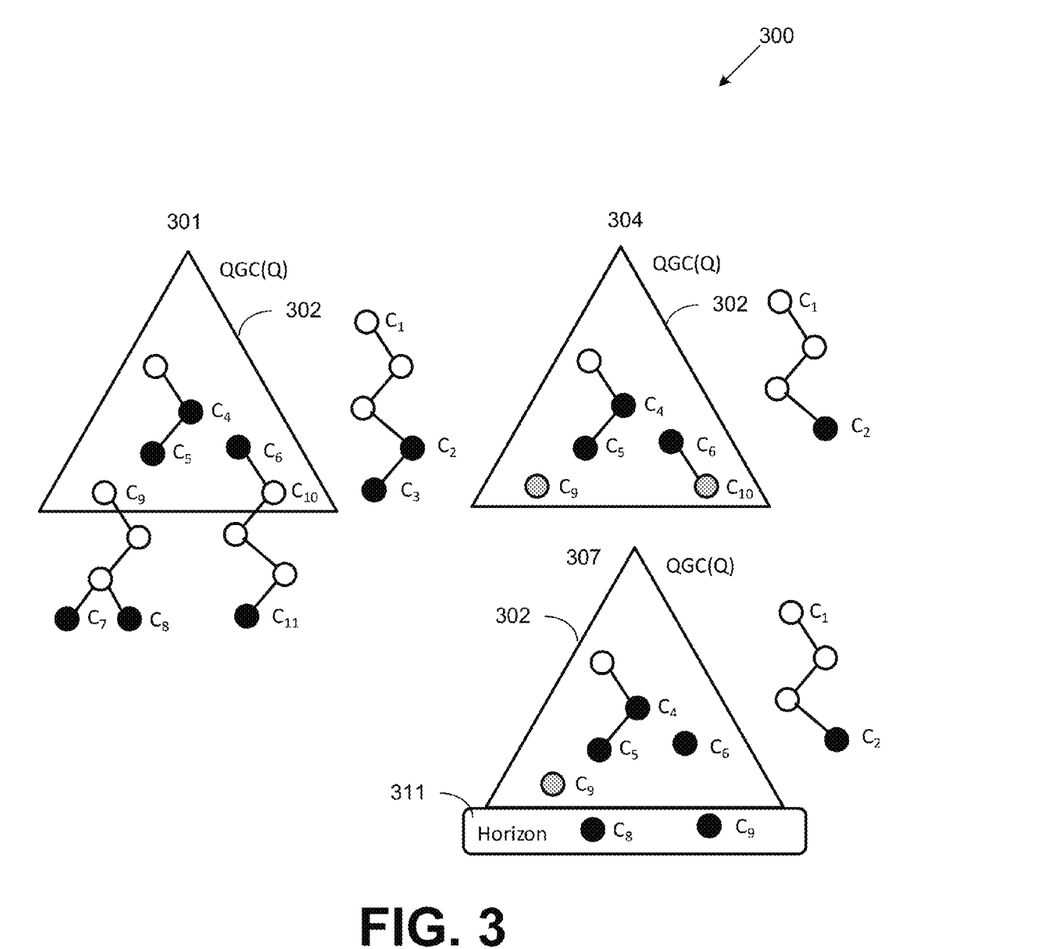
FIG. 3 is a pictorial diagram of an example approach for determining a convergence of utility taxonomy nodes and relevant taxonomy nodes for recommendation according to various embodiments of the present disclosure.

Referring next to FIG. 3, shown is an example pictorial diagram 300 depicting an approach for determining a convergence 271 (FIG. 2) of utility nodes 261 (FIG. 2) and relevant nodes 267 (FIG. 2). Element 301 is a graph visualization of utility nodes 261 having a partial overlap with relevant nodes 267. Taxonomy nodes 231 (FIG. 2) included in the triangle depicted by element 302 have been determined as utility nodes 261. The filled circles identified as C2, C3, C4, C5, C6, C7, C8, and C11 correspond to relevant nodes 267. In this example, relevant nodes 267 C4, C5 and C6 are included in the utility nodes 261. Relevant nodes 267 C7, C8 and C11 are not included in the utility nodes 261 but have a respective ancestor taxonomy node 231 included in the utility nodes 261, identified as C9 and C10. Relevant nodes 267 C2 and C3 have no ancestor taxonomy nodes 231 in the utility nodes, and are shown instead as a disjointed subgraph having a root taxonomy node 231 C1.

Element 304 is a graph representation of a convergence 271 of the graph representation of element 301. In this example, relevant nodes 267 C7 and C8 have been rolled into their shared ancestor utility node 261 C9, thereby removing relevant nodes 267 C7 and C8 and any intermediary taxonomy nodes 231 connected to utility node 261 C9. Relevant node 267 C11 has been rolled into its ancestor utility node 261 C10, thereby removing relevant node 267 C11 and intervening taxonomy nodes 231 from the final convergence 271. Relevant node 267 C3 has been rolled into relevant node 267 C2 and removed from the final convergence 271.

Element 307 is a graph representation of a convergence 271 of the graph representation of element 301 with an additional horizon 274 (FIG. 2) denoted as element 311. Relevant nodes 267 C8 and C9 are included in the horizon 274 for inclusion in a final node collection 264 (FIG. 2) for having corresponding relevance scores 257 meeting or exceeding a predefined relevance threshold, or satisfying another criteria. In this example, utility node 261 C10 has been rolled into its ancestor utility node 261 C6 so that combined final convergence 271 and horizon 274 satisfy a predefined size threshold.

Figure 4:
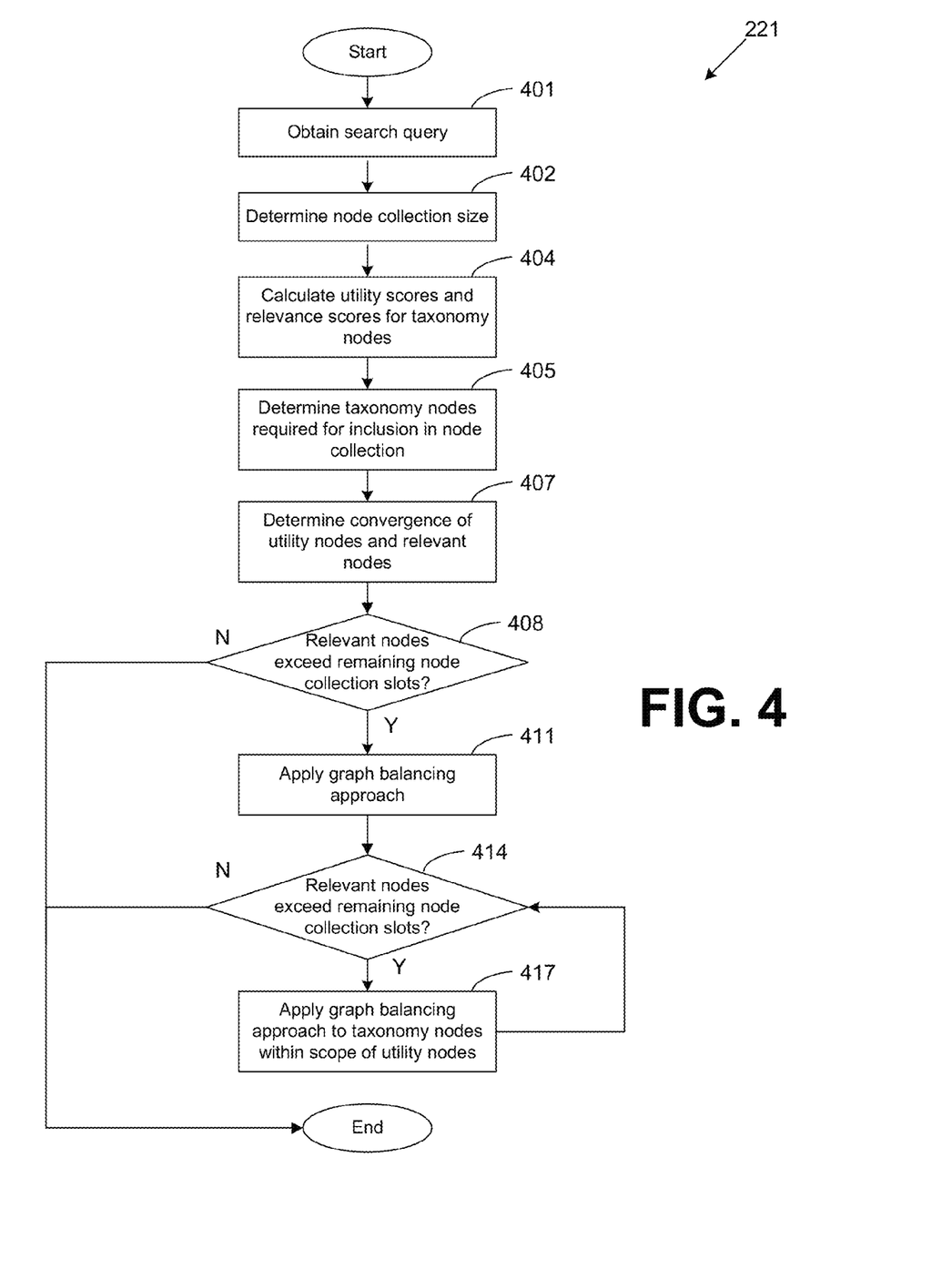
FIG. 4 is a flowchart illustrating one example of functionality implemented as portions of a node selection application executed in a computing environment in the networked environment of FIG. 2 according to various embodiments of the present disclosure.

Referring next to FIG. 4, shown is a flowchart that provides one example of the operation of a portion of the node selection application 221 according to various embodiments. It is understood that the flowchart of FIG. 4 provides merely an example of the many different types of functional arrangements that may be employed to implement the operation of the portion of the node selection application 221 as described herein. As an alternative, the flowchart of FIG. 4 may be viewed as depicting an example of elements of a method implemented in the computing environment 201 (FIG. 2) according to one or more embodiments.

Beginning with box 401, the node selection application 221 obtains a search query 237 (FIG. 2). The search query 237 may be obtained from the electronic commerce system 214 (FIG. 2) in response to a submission of the search query 237 by a client device 204 (FIG. 2) or by another approach. Next, in box 402, the node selection application 221 determines a size for a node collection 264 (FIG. 2). This may be determined, for example, according to a size of a display area of a network page 227 (FIG. 2) into which an indication of the node collection 264 will be included. This may also be determined through an indication of a parameter in a request communicated from the client device 204, such as a request including the submission of the search query 237, or another request. This may also be determined according to client application 251 (FIG. 2) parameters defining the size of the node collection 264, or by another approach.

The node selection application 221 calculates utility scores 254 (FIG. 2) and relevance scores 257 (FIG. 2) for taxonomy nodes 231 (FIG. 2) in the catalog 234 (FIG. 2) in box 404. The utility scores 254 may be calculated for those taxonomy nodes 231 grouping items 224 (FIG. 2) responsive to the search query 237 obtained from the client device 204 or for the corpus of the taxonomy, or another set of taxonomy nodes 231.

A utility score 254 may be calculated as a function of a probability that a user action 244 (FIG. 2) will occur after selection of the taxonomy node 231 and submission of the search query 237 according to session data 241 (FIG. 2). The session data 241 from which utility scores 254 are calculated may be limited to a predefined time period, or otherwise limited. The probability of a respective user action 244 may be calculated as a function of a number of sessions for the search query 237 and taxonomy node 231 in which the user action 244 was performed with respect to the totality of sessions for the search query 237 and taxonomy node 231.

In some embodiments, the utility score 254 may be calculated as a function of a weighted sum of the probabilities that various types of user actions 244 will occur, or by another approach.

The taxonomy nodes 231 for which relevance scores 257 are calculated may be the same or different than those for which utility scores 254 are calculated. Relevance scores 257 may be calculated according to a degree to which items 224 responsive to the search query 237 are included in the respective taxonomy node 231, or by any other approach as can be appreciated.

After calculating the utility scores 254 and relevance scores 257, in box 405, the node selection application 221 determines which taxonomy nodes 231, if any, are required for inclusion in the node collection 264. This may include, for example, adding to the node collection 264 a default taxonomy node 231 or a taxonomy node 231 indicated as being included in the node collection 264. This may also include, for example, determining if a taxonomy node 231 has a relevance score 257 meeting or exceeding a predefined relevance threshold. Other nodes may also be required for inclusion in the node collection 264.

Next, in box 407, the node selection application 221 determines a convergence 271 for utility nodes 261 (FIG. 2) having a highest utility score 254 and relevant nodes 267 (FIG. 2) having a highest relevance score 257. This may include, for example, rolling a descendant relevant node 267 excluded from the utility nodes 261 into an ancestor utility node 261. This may also comprise including, in the convergence, those relevant nodes 267 that are also utility nodes 261. This may also comprise including, in the convergence, subgraphs of relevant nodes 267 having no ancestor utility nodes 261. Such subgraphs would be considered outside the scope of the utility nodes 261.

Next, in box 408, the node selection application 221 determines if a number of relevant nodes 267 in the convergence 271 exceeds a number of available slots in the node collection 264. If not, then the relevant nodes 267 of the convergence 271 may be added to the node collection 264 and the process ends. Otherwise, the process advances to box 411, where a graph balancing approach is applied to the convergence 271 to reduce the number of relevant nodes 267. The graph balancing approach may be applied to the relevant nodes 267 of the convergence within the scope of the utility nodes 261 or the disjoint subgraphs of relevant nodes 267 having no overlap or common ancestry with the utility nodes 261.

In box 414, the node selection application 221 determines if the number of relevant nodes 267 in the convergence 271 exceeds a number of available slots in the node collection 264 after the first iteration of graph balancing is applied in box 411. If not, then the relevant nodes 267 of the convergence 271 may be added to the node collection 264 and the process ends. Otherwise, in box 417, the graph balancing approach is applied to the portion of the convergence 271 within the scope of the utility nodes 261. The process repeats through boxes 414 and 417 until the number of relevant nodes 267 in the convergence 271 meets or falls below the number of available slots in the node collection 264, after which the process ends.

Figure 5:
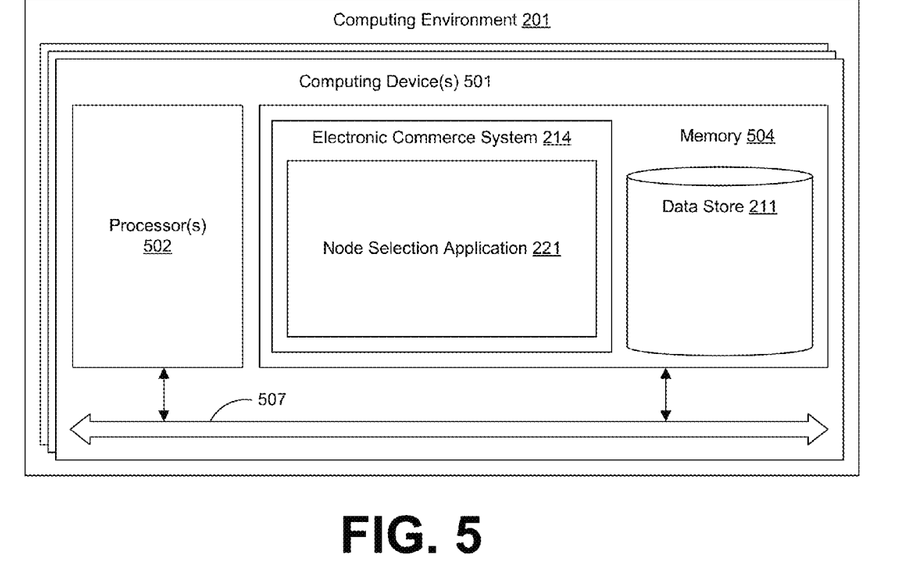
FIG. 5 is a schematic block diagram that provides one example illustration of a computing environment employed in the networked environment of FIG. 2 according to various embodiments of the present disclosure.

With reference to FIG. 5, shown is a schematic block diagram of the computing environment 201 according to an embodiment of the present disclosure. The computing environment 201 includes one or more computing devices 501. Each computing device 501 includes at least one processor circuit, for example, having a processor 502 and a memory 504, both of which are coupled to a local interface 507. To this end, each computing device 501 may comprise, for example, at least one server computer or like device. The local interface 507 may comprise, for example, a data bus with an accompanying address/control bus or other bus structure as can be appreciated.

Stored in the memory 504 are both data and several components that are executable by the processor 502. In particular, stored in the memory 504 and executable by the processor 502 are an electronic commerce system 214 having a node selection application 221, and potentially other applications. Also stored in the memory 504 may be a data store 211 and other data. In addition, an operating system may be stored in the memory 504 and executable by the processor 502.

It is understood that there may be other applications that are stored in the memory 504 and are executable by the processor 502 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 504 and are executable by the processor 502. In this respect, the term "executable" means a program file that is in a form that can ultimately be run by the processor 502. Examples of executable programs may be, for example, a compiled program that can be translated into machine code in a format that can be loaded into a random access portion of the memory 504 and run by the processor 502, source code that may be expressed in proper format such as object code that is capable of being loaded into a random access portion of the memory 504 and executed by the processor 502, or source code that may be interpreted by another executable program to generate instructions in a random access portion of the memory 504 to be executed by the processor 502, etc. An executable program may be stored in any portion or component of the memory 504 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 504 is defined herein as including both volatile and nonvolatile memory and data storage components. Volatile components are those that do not retain data values upon loss of power. Nonvolatile components are those that retain data upon a loss of power. Thus, the memory 504 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 502 may represent multiple processors 502 and/or multiple processor cores and the memory 504 may represent multiple memories 504 that operate in parallel processing circuits, respectively. In such a case, the local interface 507 may be an appropriate network that facilitates communication between any two of the multiple processors 502, between any processor 502 and any of the memories 504, or between any two of the memories 504, etc. The local interface 507 may comprise additional systems designed to coordinate this communication, including, for example, performing load balancing. The processor 502 may be of electrical or of some other available construction.

Although the node selection application 221 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIG. 4 shows the functionality and operation of an implementation of portions of the node selection application 221. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 502 in a computer system or other system. The machine code may be converted from the source code, etc. If embodied in hardware, each block may represent a circuit or a number of interconnected circuits to implement the specified logical function(s).

Although the flowcharts of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. Further, in some embodiments, one or more of the blocks shown in FIG. 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the node selection application 221, that comprises software or code can be embodied in any non-transitory computer-readable medium for use by or in connection with an instruction execution system such as, for example, a processor 502 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the node selection application 221, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 501, or in multiple computing devices in the same computing environment 201. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable storage medium embodying a program executable in at least one computing device to improve results of a search query, wherein when executed the program causes the at least one computing device to at least:

select, as a plurality of utility nodes, a first subset of a plurality of taxonomy nodes of a catalog of items based at least in part on a plurality of utility scores corresponding to the plurality of taxonomy nodes, the plurality of utility scores being based at least in part on a weighted probability of a plurality of user interactions with respect to the search query and a respective one of the plurality of taxonomy nodes;

select, as a plurality of relevant nodes, a second subset of the plurality of taxonomy nodes based at least in part on a plurality of relevance scores corresponding to the plurality of taxonomy nodes, the plurality of relevance scores being based at least in part on the search query;

determine a convergence of the plurality of utility nodes and the plurality of relevant nodes, wherein the convergence comprises: those of the plurality of relevant nodes included in the plurality of relevant nodes, those of the plurality of utility nodes having a respective descendant relevant node excluded from the plurality of utility nodes, and those of the plurality of relevant nodes excluded from the plurality of utility nodes and lacking an ancestor node included in the plurality of utility nodes;

apply a graph balancing approach to the convergence until the convergence meets or falls below a predefined size threshold;

select, from the convergence, a collection of taxonomy nodes as the improved results of the search query; and communicate an indication of the collection of taxonomy nodes based at least in part on the convergence to a client device to facilitate a browsing of the catalog responsive to the search query and a selected one of the collection of taxonomy nodes.

2. The non-transitory computer-readable storage medium of claim 1, wherein the collection of taxonomy nodes is further selected from at least one required taxonomy node.

3. The non-transitory computer-readable storage medium of claim 2, wherein the collection of taxonomy nodes is further selected from at least one of the plurality of relevant nodes having a relevance score meeting or exceeding a predefined relevance threshold.

4. A system to improve results of a search query, comprising:

at least one computing device comprising one or more processors and memory; and an application executable in the at least one computing device, wherein when executed the application causes the at least one computing device to at least:

calculate, for individual ones of a plurality of taxonomy nodes in a catalog of items, a respective one of a plurality of utility scores based at least in part on the search query and a user interaction history with respect to the search query and a respective one of the plurality of taxonomy nodes;

calculate, for individual ones of the plurality of taxonomy nodes in the catalog of items, a plurality of relevance scores;

select, based at least in part on a convergence between the plurality of utility scores and the plurality of relevance scores, at least one of the plurality of taxonomy nodes;

encode for rendering by a client device a network page comprising at least one navigation aid corresponding to the at least one of the plurality of taxonomy nodes as the improved results of the search query; and wherein a selection of one of the at least one navigation aid initiates a browsing of a subset of the catalog of items responsive to the search query and classified by a corresponding one of the at least one of the plurality of taxonomy nodes.

5. The system of claim 4, wherein the user interaction history indicates at least one user interaction with the search query as a last submitted search query and the respective one of the plurality of taxonomy nodes as a last selected taxonomy node.

6. The system of claim 4, wherein calculating the respective one of the plurality of utility scores comprises applying a respective one of a plurality of weights according to a type of action indicated in the user interaction history.

7. The system of claim 4, wherein the at least one of the plurality of taxonomy nodes is selected according to a maximum count threshold.

8. The system of claim 7, wherein the maximum count threshold is based at least in part on a display area for displaying the at least one navigation aid.

9. The system of claim 7, wherein when executed the application further causes the at least one computing device to at least apply a graph balancing approach to the at least one of the plurality of taxonomy nodes until a size of the at least one of the plurality of taxonomy nodes meets or falls below the maximum count threshold.

10. The system of claim 7, wherein when executed the application further causes the at least one computing device to at least:

calculate, for the individual ones of the plurality of taxonomy nodes in a catalog of items, a respective one of a plurality of relevance scores based at least in part on the search query; and wherein the at least one of the plurality of taxonomy nodes is selected based at least in part on the plurality of relevance scores.

11. The system of claim 9, wherein selecting the at least one of the plurality of taxonomy nodes further comprises:

selecting a first subset of the plurality of taxonomy nodes based at least in part on the plurality of utility scores;

selecting a second subset of the plurality of taxonomy nodes based at least in part on a plurality of relevance scores; and selecting the at least one of the plurality of taxonomy nodes based at least in part on a convergence between the first subset of the plurality of taxonomy nodes and the second subset of the plurality of taxonomy nodes.

12. The system of claim 11, wherein selecting the at least one of the plurality of taxonomy nodes further comprises including, in the at least one of the plurality taxonomy nodes, one of the second subset of the plurality of taxonomy nodes having a corresponding one of the plurality of relevance scores meeting a predefined relevance threshold.

13. The system of claim 4, wherein selecting the at least one of the plurality of taxonomy nodes further comprises including, in the at least one of the plurality taxonomy nodes, at least one required taxonomy node.

14. A method to improve results of a search query, comprising:

selecting, by at least one computing device, as at least one utility node, a first subset of a plurality of taxonomy nodes of a catalog of items based at least in part on a plurality of utility scores corresponding to the plurality of taxonomy nodes, the plurality of utility scores being based at least in part on a user interaction history of an electronic commerce system with respect to the search query;

selecting, by the at least one computing device, as at least one relevant node, a second subset of the plurality of taxonomy nodes based at least in part on a plurality of relevance scores corresponding to the plurality of taxonomy nodes, the plurality of relevance scores being based at least in part on the search query;

selecting, by the at least one computing device, at least one of the plurality of taxonomy nodes according to a convergence of the at least one utility node and the at least one relevant node as the improved results of the search query; and communicating, by the at least one computing device, an indication of the at least one of the plurality of taxonomy nodes to a client device facilitating a browsing of the catalog of items responsive to the search query and a selected one of the at least one of the plurality of taxonomy nodes.

15. The method of claim 14, wherein the user interaction history indicates an action taken with respect to the electronic commerce system for a one of the plurality of taxonomy nodes being last selected after a previous submission of the search query.

16. The method of claim 15, wherein the action comprises at least one of an addition to a shopping cart, an item detail browsing, a list addition, a purchase, or a session conclusion.

17. The method of claim 14, further comprising determining the convergence by:

excluding, by the at least one computing device, from the convergence, a descendant node included in the at least one relevant node and excluded from the at least one utility node, the descendant node having an ancestor node in the at least one utility node; and including, by the at least one computing device, in the convergence, the ancestor node.

18. The method of claim 14, further comprising applying a graph balancing approach to at least a portion of the convergence until a size of the convergence meets or falls below a predefined size threshold.

19. The method of claim 14, wherein the at least one of the plurality of taxonomy nodes comprises at least one taxonomy node having a respective one of the plurality of relevance scores meeting a predefined relevance threshold.

20. The method of claim 14, wherein the at least one of the plurality of taxonomy nodes comprises at least one default taxonomy node or at least one required taxonomy node.

* * * * *